(12) United States Patent
Nakayama et al.

(10) Patent No.: US 11,811,053 B2
(45) Date of Patent: Nov. 7, 2023

(54) POSITIVE ELECTRODE AND SECONDARY BATTERY

(71) Applicant: Panasonic Intellectual Property Management Co., Ltd., Osaka (JP)

(72) Inventors: Takahito Nakayama, Osaka (JP); Tomoki Shiozaki, Osaka (JP); Hideharu Takezawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 632 days.

(21) Appl. No.: 17/040,693

(22) PCT Filed: Feb. 22, 2019

(86) PCT No.: PCT/JP2019/006865
§ 371 (c)(1),
(2) Date: Sep. 23, 2020

(87) PCT Pub. No.: WO2019/207934
PCT Pub. Date: Oct. 31, 2019

(65) Prior Publication Data
US 2021/0075002 A1   Mar. 11, 2021

(30) Foreign Application Priority Data
Apr. 25, 2018   (JP) ................ 2018-084399

(51) Int. Cl.
*H01M 4/131* (2010.01)
*H01M 4/36* (2006.01)
(Continued)

(52) U.S. Cl.
CPC ........... *H01M 4/364* (2013.01); *H01M 4/131* (2013.01); *H01M 4/66* (2013.01); *H01M 2004/028* (2013.01)

(58) Field of Classification Search
CPC ........ H01M 4/364; H01M 4/131; H01M 4/66; H01M 2004/028
See application file for complete search history.

(56) References Cited

U.S. PATENT DOCUMENTS

| 2010/0291442 A1 | 11/2010 | Wang et al. |
| 2016/0190566 A1 | 6/2016 | Shiozaki et al. |
| 2017/0271708 A1 | 9/2017 | Yoshima et al. |

FOREIGN PATENT DOCUMENTS

| CN | 105742573 A | 7/2016 |
| CN | 107204486 A | 9/2017 |

(Continued)

OTHER PUBLICATIONS

English translation of Chinese Search Report dated Nov. 29, 2022, issued in counterpart CN Application No. 201980018030.6. (3 pages).

(Continued)

*Primary Examiner* — Jane J Rhee
(74) *Attorney, Agent, or Firm* — WHDA, LLP

(57) ABSTRACT

A positive electrode (11) according to one embodiment is provided with: a positive electrode collector (30); a first middle layer (32) disposed on one of two surfaces of the positive electrode collector (30), the surface being on the inner circumferential side when the positive electrode collector (30) is wound; a second middle layer (34) that is disposed on the other surface that is on the outer circumferential side; and a positive electrode mixed material layer (36) disposed on the first middle layer (32) and on the second middle layer (34). The first middle layer (32) and the second middle layer (34) contain insulating particles and an electrical conductor, and the thickness of the first middle layer (32) is less than the thickness of the second middle layer (34).

10 Claims, 2 Drawing Sheets

(51) Int. Cl.
*H01M 4/66* (2006.01)
*H01M 4/02* (2006.01)

(56) References Cited

FOREIGN PATENT DOCUMENTS

| | | |
|---|---|---|
| JP | 10-302802 A | 11/1998 |
| JP | 2007-103263 A | 4/2007 |
| JP | 2008-21453 A | 1/2008 |
| JP | 2010-108703 A | 5/2010 |
| JP | 2011-501383 A | 1/2011 |
| JP | 2013-140714 A | 7/2013 |
| JP | 2016-127000 A | 7/2016 |

OTHER PUBLICATIONS

International Search Report dated May 28, 2019, issued in counterpart International Application No. PCT/JP2019/006865. (2 pages).

POSITIVE ELECTRODE AND SECONDARY BATTERY

TECHNICAL FIELD

The present invention relates to techniques of a positive electrode and a secondary battery.

BACKGROUND ART

Recently, a non-aqueous electrolyte secondary battery has been widely used that comprises a positive electrode, a negative electrode, and a non-aqueous electrolyte and achieves charge and discharge by movement of lithium ions or the like between positive and negative electrodes, the secondary battery providing high output and a high energy density.

For example, Patent Literature 1 discloses a non-aqueous electrolyte secondary battery comprising a power generating element that includes a wound positive electrode plate having positive electrode mixture layers on both sides thereof, and the non-aqueous electrolyte secondary battery is characterized in that the positive electrode mixture layer on the first side, which is the inner peripheral side among both sides of the positive electrode plate, has a higher flexibility than the other positive electrode mixture layer on the second side, which is the rear side of the first side and therefore the outer peripheral side.

For example, Patent Literature 2 discloses a non-aqueous electrolyte secondary battery comprising a positive electrode, the positive electrode comprising: a positive electrode current collector mainly composed of aluminum; a protective layer (intermediate layer) disposed on the positive electrode current collector; and a positive electrode mixture layer containing a lithium-containing transition metal oxide and disposed on the protective layer, wherein the protective layer has a thickness of 1 to 5 μm and contains an electro-conductive material and an inorganic compound having an oxidation power lower than that of the lithium-containing transition metal oxide.

CITATION LIST

Patent Literature

PATENT LITERATURE 1: Japanese Unexamined Patent Application Publication No. 2007-103263
PATENT LITERATURE 2: Japanese Unexamined Patent Application Publication No. 2016-127000

SUMMARY

An intermediate layer that includes insulating particles of an inorganic compound or the like and is disposed between the positive electrode current collector and the positive electrode mixture layer, as in Patent Literature 2, can suppress the temperature rise of the battery upon internal short. However, in the case where the volume of the battery is predetermined, the proportion of the positive electrode mixture layer is to be reduced by the volume of the intermediate layer including insulating particles, and thus a battery capacity per unit volume may be reduced.

Therefore, an advantage of the present disclosure is to provide a positive electrode that can prevent the reduction in the battery capacity and suppress temperature rise of the battery upon internal short, and a secondary battery comprising the positive electrode.

A positive electrode according to one aspect of the present disclosure is a positive electrode for use in a secondary battery, the positive electrode being to be wound in the secondary battery and comprising:
a positive electrode current collector,
a first intermediate layer disposed on a side that is to be an inner peripheral side when wound, among both sides of the positive electrode current collector,
a second intermediate layer disposed on another side that is to be an outer peripheral side when wound,
a positive electrode mixture layer disposed on the first intermediate layer, and another positive electrode mixture layer disposed on the second intermediate layer,
wherein the first intermediate layer and the second intermediate layer each include insulating particles and a conductive agent,
and a thickness of the first intermediate layer is smaller than a thickness of the second intermediate layer.

A positive electrode according to one aspect of the present disclosure is a positive electrode for use in a secondary battery, the positive electrode being to be wound in the secondary battery and comprising:
a positive electrode current collector,
a first intermediate layer disposed on a side that is to be an inner peripheral side when wound, among both sides of the positive electrode current collector,
a second intermediate layer disposed on another side that is to be an outer peripheral side when wound,
a positive electrode mixture layer disposed on the first intermediate layer, and another positive electrode mixture layer disposed on the second intermediate layer,
wherein the first intermediate layer and the second intermediate layer each include insulating particles and a conductive agent,
and a mass of the insulating particles per unit area in the first intermediate layer is smaller than a mass of the insulating particles per unit area in the second intermediate layer.

A secondary battery according to one aspect of the present disclosure comprises the positive electrode described above.

According to the present disclosure, the reduction in the battery capacity can be prevented and also, temperature rise of the battery upon internal short can be suppressed.

DESCRIPTION OF EMBODIMENTS

Exemplary embodiments of the present disclosure will be described below with reference to drawings.

Figure 1:
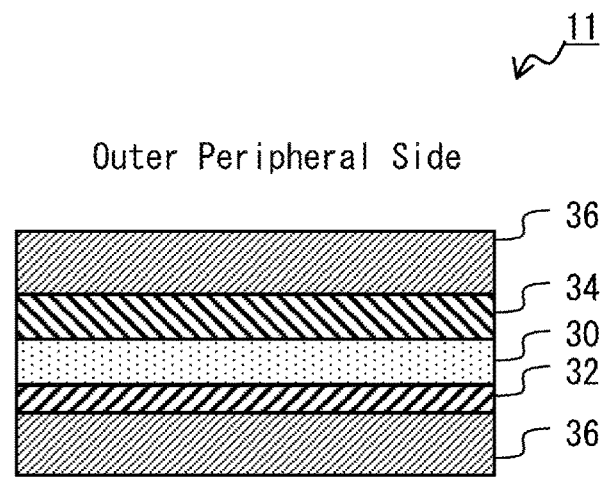
FIG. 1 is a fragmentary sectional view of a positive electrode of an embodiment.

FIG. 1 is a fragmentary sectional view of a positive electrode of an embodiment. The positive electrode 11 of the embodiment is belt-shaped, and is to be wound when a secondary battery is produced. Specifically, the positive electrode 11 is wound together with a negative electrode and a separator to thereby produce an electrode assembly. The positive electrode 11 of the embodiment will now be described as a positive electrode applied to a non-aqueous electrolyte secondary battery; however, the secondary battery to which the positive electrode 11 of the embodiment is applied is not limited to a non-aqueous electrolyte secondary battery and may be another type of secondary battery such as an alkaline secondary battery.

As shown in FIG. 1, the positive electrode 11 has a positive electrode current collector 30; the first intermediate layer 32 disposed on the side that is to be the inner peripheral side when wound, among both sides of the positive electrode current collector 30; the second intermediate layer 34 disposed on the other side that is to be the outer peripheral side when wound; a positive electrode mixture layer 36 disposed on the first intermediate layer 32, and another positive electrode mixture layer 36 disposed on the second intermediate layer 34. The side of the positive electrode current collector 30 that is to be the inner peripheral side refers to the side of the positive electrode current collector 30 that is to be positioned, when the positive electrode 11 is wound, on the inside in the radial direction of the wound positive electrode, and the other side of the positive electrode current collector 30 that is to be the outer peripheral side refers to the side of the positive electrode current collector 30 that is to be positioned, when the positive electrode 11 is wound, on the outside in the radial direction of the wound positive electrode 11.

The first intermediate layer 32 and the second intermediate layer 34 each include insulating particles and a conductive agent. Preferably, the first intermediate layer 32 and the second intermediate layer 34 each include a binder in view of, for example, adhesiveness to the positive electrode current collector 30 and the positive electrode mixture layer 36, and adhesiveness of particles to each other in the intermediate layer.

In the positive electrode 11 shown in FIG. 1, the thickness of the first intermediate layer 32 is smaller than the thickness of the second intermediate layer 34. When the positive electrode 11 in which the thickness of the first intermediate layer 32 is smaller than the thickness of the second intermediate layer 34 is used, the reduction in the battery capacity can be prevented and also, temperature rise of the battery upon internal short can be suppressed. For example, the following may be considered as the reason for that.

Figure 2:
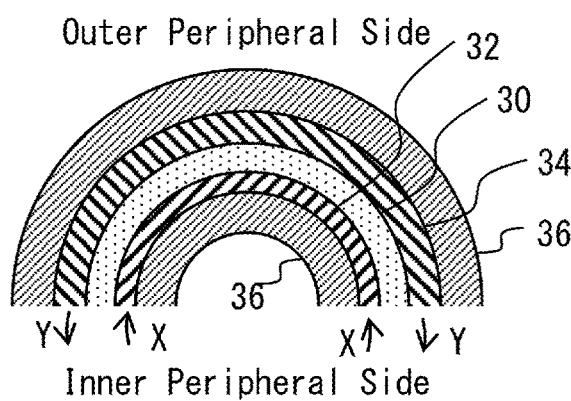
FIG. 2 is a fragmentary sectional view of a positive electrode of an embodiment when the positive electrode is wound and viewed in the direction along the winding axis.

FIG. 2 is a fragmentary sectional view of a positive electrode of the embodiment when the positive electrode is wound and viewed in the direction along the winding axis. When the positive electrode 11 is wound in producing a secondary battery, a compressive stress as indicated by the arrow X in FIG. 2 is applied to the first intermediate layer 32, which is disposed on the inner peripheral side of the positive electrode current collector 30, and a tensile stress as indicated by the arrow Y in FIG. 2 is applied to the second intermediate layer 34, which is disposed on the outer peripheral side of the positive electrode current collector 30, due to the difference in the curvature. Then, in the first intermediate layer 32, to which a compressive stress is applied, the mass of insulating particles per unit area increases (on the other hand, in the second intermediate layer 34, to which a tensile stress is applied, the mass of insulating particles per unit area decreases). Internal short occurs, when a conductive foreign matter taking on a negative electrode potential, or the like reaches the positive electrode current collector 30, for example. On that occasion, since the insulating particles in the intermediate layer are present as a resistance component around the conductive foreign matter, the current flowing upon internal short is suppressed, and the temperature rise of the battery is thus suppressed. Accordingly, the suppressing effect on the temperature rise of the battery upon internal short generally tends to increase in proportion to the amount of the insulating particles in the intermediate layer per unit area in the intermediate layer. Although the positive electrode 11 of the embodiment has the first intermediate layer 32 with a small thickness before winding as described above, the mass of the insulating particles per unit area in the first intermediate layer 32 increase by winding, and accordingly, the first intermediate layer 32 sufficiently functions for suppressing the temperature rise of the battery upon internal short. In addition, the positive electrode 11 of the embodiment has the first intermediate layer 32 with a smaller thickness than that of the second intermediate layer 34, the increase in the resistance of the positive electrode 11 is suppressed, and the reduction in the battery capacity is also prevented.

The thickness of the first intermediate layer 32 and that of the second intermediate layer 34 are not particularly limited as long as the former is smaller than the latter. In view of, for example, preventing the reduction in the battery capacity, the thickness of the first intermediate layer 32 is preferably within a range of 0.1 μm to 5 μm, for example, and the thickness of the second intermediate layer 34 is preferably within a range of 0.5 μm to for example. The thickness of an intermediate layer can be determined by observing the cross section of the intermediate layer under SEM, measuring the thickness at randomly selected ten location, and calculating the average of the found values thereof. In the case where the thickness of an intermediate layer of a wound positive electrode is measured, the thickness is desirably measured in the state in which the wound positive electrode is opened to straighten.

Figure 3:
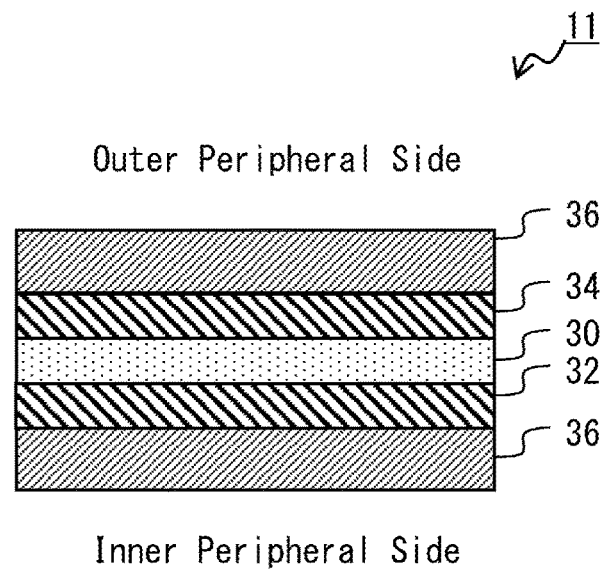
FIG. 3 is a fragmentary sectional view of a positive electrode of another embodiment.

FIG. 3 is a fragmentary sectional view of a positive electrode of another embodiment. As shown in FIG. 3, the positive electrode 11 has: a positive electrode current collector 30; the first intermediate layer 32 disposed on the side that is to be the inner peripheral side when wound, among both sides of the positive electrode current collector 30; the second intermediate layer 34 disposed on the other side that is to be the outer peripheral side when wound; a positive electrode mixture layer 36 disposed on the first intermediate layer 32, and another positive electrode mixture layer 36 disposed on the second intermediate layer 34.

The first intermediate layer 32 and the second intermediate layer 34 each include insulating particles and a conductive agent. Preferably, the first intermediate layer 32 and the second intermediate layer 34 each include a binder, as described hereinbefore.

In the positive electrode 11 shown in FIG. 3, the mass of the insulating particles per unit area in the first intermediate layer 32 is smaller than the mass of the insulating particles per unit area in the second intermediate layer 34. When the positive electrode 11 is used in which the mass of the insulating particles per unit area in the first intermediate layer 32 is smaller than the mass of the insulating particles per unit area in the second intermediate layer 34, the reduction in the battery capacity can be prevented and also, temperature rise of the battery upon internal short can be suppressed. For example, the following may be considered as the reason for that.

As described hereinbefore, when the positive electrode 11 is wound in producing a secondary battery, a compressive stress as indicated by the arrow X in FIG. 2 is applied to the first intermediate layer 32, and the mass of the insulating particles per unit area thus increases (on the other hand, a tensile stress as indicated by the arrow Y in FIG. 2 is applied to the second intermediate layer 34, and the mass of the insulating particles per unit area thus decreases). Accordingly, even though the mass of insulating particles per unit area is smaller in the first intermediate layer 32 as in the positive electrode 11 of the other embodiment, the mass of the insulating particles per unit area in the first intermediate layer 32 increases by winding, and thus the first intermediate layer 32 sufficiently functions for suppressing the temperature rise of the battery upon internal short. In addition, since the mass of the insulating particles per unit area in the first intermediate layer 32 is smaller than that in the second intermediate layer 34 in the positive electrode 11 of the other embodiment, the increase in the resistance of the positive electrode 11 is suppressed, and the reduction in the battery capacity is also prevented.

The mass of the insulating particles per unit area in each of the intermediate layers is not limited as long as the mass of the insulating particles per unit area in the first intermediate layer 32 is smaller than the mass of the insulating particles per unit area in the second intermediate layer 34. In view of, for example, further preventing the reduction in the battery capacity, the mass of the insulating particles per unit area in the first intermediate layer 32 is preferably within a range of 0.1 $g/m^2$ to 5 $g/m^2$, for example, and the mass of the insulating particles per unit area in the second intermediate layer 34 is preferably within a range of 0.5 $g/m^2$ to 10 $g/m^2$, for example.

The mass of the insulating particles per unit area in an intermediate layer is the value obtained by dividing the mass of the insulating particles in the first or second intermediate layer by the area of the first or second intermediate layer. The area of the first or second intermediate layer refers to a projected area when viewing the first or second intermediate layer from the front. The mass of the insulating particles per unit area in an intermediate layer is determined in the following manner.

A slurry for the first intermediate layer, which will be described later, is applied to one side of the positive electrode current collector, and the mass (A) of the resultant is measured. The mass of the positive electrode current collector is subtracted from the mass (A), to thereby obtain the mass of the first intermediate layer, (B). Then, a slurry for the second intermediate layer, which will be described later, is applied to the other side of the positive electrode current collector, and the mass (C) of the resultant is measured. The mass (A) is subtracted from the mass (C), to thereby obtain the mass of the second intermediate layer, (D). The mass (A) of the first intermediate layer is combined with the percentage of the insulating particles in the slurry for the first intermediate layer, to thereby obtain the mass of the insulating particles per unit area in the first intermediate layer. The mass of the insulating particles per unit area in the second intermediate layer is also determined in the same manner as above.

The following is an exemplary case where the mass of the insulating particles per unit area in an intermediate layer in a produced positive electrode is determined, wherein the insulating particles are of aluminum. In a positive electrode that has been cut out so as to have a predetermined area, a positive electrode mixture layer and the second intermediate layer, which are disposed on one side of the positive electrode current collector, are removed by mechanical polishing or the like from the surface of the positive electrode current collector. Then, the positive electrode current collector is peeled from the positive electrode mixture layer and the first intermediate layer by using a solvent or the like. The remaining positive electrode mixture layer and first intermediate layer are dissolved with an acid, and the resulting solution was analyzed using inductively coupled plasma (ICP) to measure the amount of the aluminum element. Separately, in a positive electrode that has been cut out so as to have a predetermined area, another positive electrode mixture layer and the first intermediate layer, which are disposed on the other side of the positive electrode current collector, are removed by mechanical polishing or the like from the surface of the positive electrode current collector. Then, the positive electrode current collector is peeled from the positive electrode mixture layer and the second intermediate layer by using a solvent or the like. The remaining positive electrode mixture layer and second intermediate layer are dissolved with an acid, and the resulting solution was analyzed using inductively coupled plasma (ICP) to measure the amount of the aluminum element. These values are each converted into the amount of aluminum oxide, and the mass of the insulating particles per unit area in each of first intermediate layer and the second intermediate layer is calculated. If the positive electrode mixture layer also include aluminum, the content in the positive electrode mixture layer is subtracted. As an alternative method for determining the content of the insulating particles, a method suitable for the substance as the object is preferably applied, such as X-ray fluorescence analysis or ion chromatography.

For the positive electrode 11, it is preferable that the mass of the insulating particles per unit area in the first intermediate layer 32 be smaller than the mass of the insulating particles per unit area in the second intermediate layer 34 and also that the thickness of the first intermediate layer 32 be smaller than the thickness of the second intermediate layer 34. This enables further preventing the reduction in the battery capacity. The thickness of the first intermediate layer 32 and the thickness of the second intermediate layer 34 are preferably within the respective range described hereinbefore, for example.

The insulating particles included in the first intermediate layer 32 and the second intermediate layer 34 are preferably, for example, an inorganic material having a resistivity of $10^{12}$ Ωcm or more in view of, for example, effectively suppressing the temperature rise of the battery upon internal short. Specific examples of the insulating particles include metal oxide particles, metal nitride particles, metal fluoride particles, and insulating magnetic particles. Examples of the metal oxide particles include aluminum oxide, titanium oxide, zirconium oxide, silicon oxide, manganese oxide, magnesium oxide, and nickel oxide. Examples of the metal nitride particles include boron nitride, aluminum nitride, magnesium nitride, and silicon nitride. Examples of the metal fluoride particles include aluminum fluoride, lithium fluoride, sodium fluoride, magnesium fluoride, calcium fluoride, and barium fluoride. Examples of the insulating magnetic particles include Ni—Cu—Zn ferrite. Other examples include aluminum hydroxide and boehmite. The insulating particles preferably include at least one selected from the group consisting of aluminum oxide, titanium oxide, silicon oxide, and manganese oxide, and more preferably include at least aluminum oxide, in view of the insulation property and a high melting point. The insulating particles included in the first intermediate layer 32 and those in the second intermediate layer 34 may be the same material or may be different materials.

For example, the content of the insulating particles in the first intermediate layer 32 and that in the second intermediate layer 34 are each preferably within a range of 80 mass % to 98 mass %. If the content of the insulating particles is out of the range described above, the suppressing effect on the temperature rise of the battery upon internal short may be diminished as compared to the case where the content is within the range described above.

Examples of the conductive agent included in the first intermediate layer 32 and the second intermediate layer 34 include carbon particles such as carbon black (CB), acetylene black (AB), Ketjen black, and graphite. These may be used singly or may be used in combinations of two or more thereof. The conductive agent included in the first intermediate layer 32 and that in the second intermediate layer 34 may be the same material or may be different materials.

The content of the conductive agent in the first intermediate layer 32 and that in the second intermediate layer 34 are each preferably within a range of 0.1 mass % to 5 mass %, for example. If the content of the conductive agent is out of the range described above, the preventing effect on the reduction in the battery capacity may be diminished as compared to the case where the content is within the range described above.

Examples of the binder included in the first intermediate layer 32 and that in the second intermediate layer 34 include fluoro resins, such as polytetrafluoroethylene (PTFE) and poly(vinylidene fluoride) (PVdF), polyacrylonitrile (PAN), polyimides, acrylic resins, and polyolefins. These resins may be combined with carboxymethyl cellulose (CMC) or a salt thereof (e.g., CMC-Na, CMC-K, and CMC-NH$_4$; partially neutralized salt may also be used), poly(ethylene oxide) (PEO), or the like. These may be used singly or may be used in combinations of two or more thereof. The content of the binder in the first intermediate layer 32 and that in the second intermediate layer 34 are each preferably within a range of 0.1 mass % to 5 mass %, for example.

As the positive electrode current collector 30 in the positive electrode 11, foil of a metal, such as aluminum or aluminum alloy, that is stable in the electric potential range of the positive electrode 11, a film with such a metal disposed on an outer layer, or the like can be used. The positive electrode current collector 30 has a thickness of, for example, about 10 μm to 100 μm.

The positive electrode mixture layer 36 in the positive electrode 11 include a positive electrode active material. The positive electrode mixture layer 36 also preferably include a binder or a conductive agent.

Examples of the positive electrode active material include a lithium/transition metal oxide containing a transition metal element such as Co, Mn, or Ni. Examples of the lithium/transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (M; at least one of Na, Mg, Sc, Y, Mn, Fe, Co, Ni, Cu, Zn, Al, Cr, Pb, Sb, and B, $0<x\le1.2$, $0<y\le0.9$, $2.0\le z\le2.3$). These may be used singly or two or more thereof may be mixed and used. The positive electrode active material preferably include a lithium/nickel complex oxide such as $Li_xNiO_2$, $Li_xCo_yNi_{1-y}O_2$, $Li_xNi_{1-y}M_yO_z$ (M; at least one of Na, Mg, Sc, Y, Mn, Fe, Co, Ni, Cu, Zn, Al, Cr, Pb, Sb, and B, $0<x\le1.2$, $0<y\le0.9$, $2.0\le z\le2.3$), for a larger capacity of a non-aqueous electrolyte secondary battery.

Examples of the conductive agent include carbon particles such as carbon black (CB), acetylene black (AB), Ketjen-black, and graphite. These may be used singly or in combinations of two or more thereof.

Examples of the binder include fluoro resins, such as polytetrafluoroethylene (PTFE) and poly(vinylidene fluoride) (PVdF), polyacrylonitrile (PAN), polyimides, acrylic resins, and polyolefins. These resins may be combined with carboxymethyl cellulose (CMC) or a salt thereof (e.g., CMC-Na, CMC-K, and CMC-NH$_4$; partially neutralized salt may also be used), poly(ethylene oxide) (PEO), or the like. These may be used singly or in combinations of two or more thereof.

An exemplary method for producing the positive electrode 11 will be described. First, a slurry for a first intermediate layer including insulating particles, a conductive agent, and others is applied to one side of the positive electrode current collector 30, and the resulting slurry is dried to thereby form a first intermediate layer 32. Next, a slurry for a second intermediate layer including insulating particles, a conductive agent, and others is applied to the other side of the positive electrode current collector 30, and the resulting slurry is dried to thereby form a second intermediate layer 34. Then, a positive electrode mixture slurry including a positive electrode active material and others is applied to each of the first intermediate layer 32 and the second intermediate layer 34, and the resulting slurry is dried to thereby form positive electrode mixture layers 36. The positive electrode mixture layers 36 are rolled to obtain a positive electrode 11.

In the case where a positive electrode 11 in which the thickness of the first intermediate layer 32 is smaller than the thickness of the second intermediate layer 34 is produced, the slurries are applied such that the thickness of the slurry for a first intermediate layer applied is smaller than the thickness of the slurry for a second intermediate layer applied, for example.

In the case where a positive electrode 11 in which the mass of the insulating particles per unit area in the first intermediate layer 32 is smaller than that in the second intermediate layer 34 is produced, the slurries are prepared such that the content of the insulating particles in the slurry for a first intermediate layer is smaller than that in the slurry for a second intermediate layer, for example. In addition, the thicknesses of the first intermediate layer and the second intermediate layer are controlled such that the mass of the insulating particles per unit area in the first intermediate layer is not equal to or larger than that in the second intermediate layer. In the case where a slurry that is for a first intermediate layer and has a smaller content of insulating particles and a slurry that is for a second intermediate layer and has a larger content of insulating particles are used, the mass of the insulating particles per unit area in the first intermediate layer is to be smaller than that in the second intermediate layer when the slurries are applied such that the thickness of the first intermediate layer is equal to or smaller than (including an equal thickness) the thickness of the second intermediate layer. Alternatively, the same slurry may be used for forming the first intermediate layer and the second intermediate layer. In this case, the mass of the insulating particles per unit area in the first intermediate layer is to be smaller than that in the second intermediate layer when the slurries are applied such that the thickness of the first intermediate layer is smaller than the thickness of the second intermediate layer.

An exemplary secondary battery comprising the positive electrode 11 of the embodiment described hereinabove will be described below.

Figure 4:
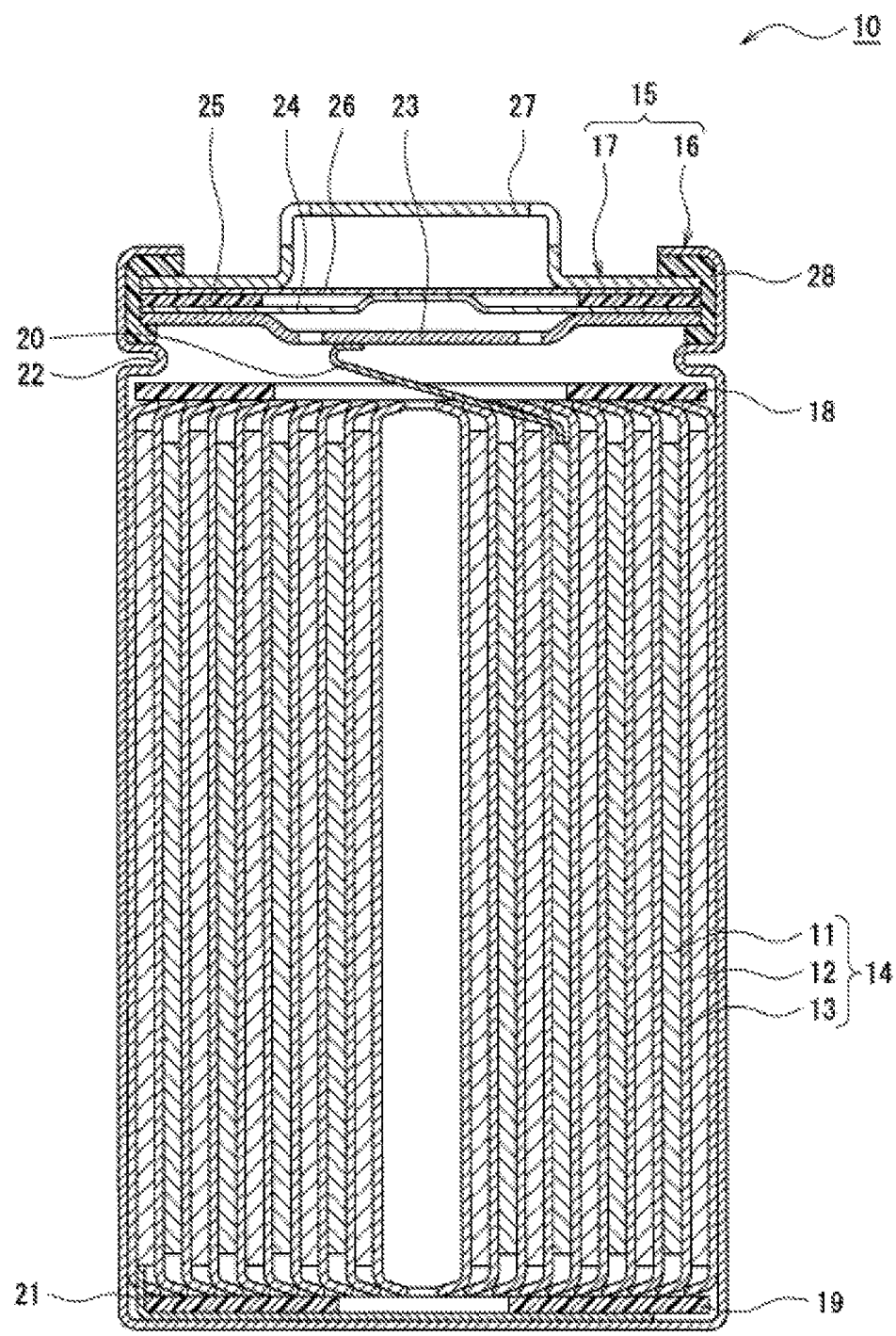
FIG. 4 is a sectional view of a secondary battery of an exemplary embodiment.

FIG. 4 is a sectional view of a secondary battery of an exemplary embodiment. The secondary battery 10 shown in FIG. 4 illustrates one example of a non-aqueous electrolyte secondary battery; however, the secondary battery of the embodiment is not limited to a non-aqueous electrolyte secondary battery and may be another type of secondary battery such as an alkaline secondary battery.

The secondary battery 10 shown in FIG. 4 comprises: an electrode assembly 14 having a wound structure in which a positive electrode 11 and a negative electrode 12 are wound together with a separator 13 therebetween; an electrolyte; insulating plates 18 and 19 respectively disposed on the upper and lower sides of the electrode assembly 14; and a battery case 15 that houses these members. The battery case 15 is constituted of a cylindrical case body 16 having a closed-end and a sealing assembly 17 for closing the opening of the case body 16. The battery case 15 is not limited to that having a cylindrical shape, and may be a rectangular case or a resin case constituted of laminated resin films (for laminate batteries), for example. However, the positive electrode of the present disclosure can more highly exhibits the suppressing effect on the reduction in the battery capacity when it is used in a cylindrical battery than in a rectangular battery or others. The electrode assembly in a cylindrical battery curves at every part when viewed in the direction along the winding axis of the wound positive electrode. Thus, an intermediate layer to which a compressive stress is applied and another intermediate layer to which a tensile stress is applied are present at every part of the electrode assembly in a cylindrical battery, and accordingly, modification on the features of these intermediate layers can effectively provide the suppressing effect on the reduction in the battery capacity.

The case body 16 is, for example, a cylindrical metal container having a closed-end. A gasket 28 is disposed between the case body 16 and the sealing assembly 17 to ensure that the battery case is tightly sealed. The case body 16 includes a projecting portion 22 formed by, for example, pressing the lateral surface from outside to support the sealing assembly 17. The projecting portion 22 is preferably formed annularly along the circumferential direction of the case body 16, and the upper surface thereof supports the sealing assembly 17.

The sealing assembly 17 has a structure in which a filter 23, a lower vent member 24, an insulating member 25, an upper vent member 26, and a cap 27 are piled in this order from the electrode assembly 14 side. Each of the members constituting the sealing assembly 17 has, for example, a disk or ring shape, and the members other than the insulating member 25 are electrically connected to each other. The lower vent member 24 and the upper vent member 26 are connected to each other at their middle portions and the insulating member 25 is interposed between their circumferences. If the internal pressure of the secondary battery 10 increases by heat generation due to, for example, internal short, the lower vent member 24 changes its shape so as to, for example, push up the upper vent member 26 toward the cap 27, and the lower vent member 24 thus ruptures to break the electrical connection between the lower vent member 24 and the upper vent member 26. If the internal pressure further increases, the upper vent member 26 ruptures to discharge gas through the opening of the cap 27.

In the secondary battery 10 shown in FIG. 4, a positive electrode lead 20 attached to the positive electrode 11 passes through a through-hole in the insulating plate 18 and extends toward the sealing assembly 17, and a negative electrode lead 21 attached to the negative electrode 12 extends on the outside of the insulating plate 19 to the bottom side of the case body 16. The positive electrode lead 20 is connected to the lower surface of the filter 23, which is the bottom board of the sealing assembly 17, by welding or the like, and the cap 27, which is the top board of the sealing assembly 17 and electrically connected to the filter 23, serves as a positive electrode terminal. The negative electrode lead 21 is connected to the inner surface of the bottom of the case body 16 by welding or the like, and the case body 16 serves as a negative electrode terminal.

[Positive Electrode]

The configuration of the positive electrode 11 is as described hereinbefore, and the description thereof is omitted here. The magnitude relationship between the mass of the insulating particles per unit area in the first intermediate layer 32 disposed on the inner peripheral side of the wound positive electrode current collector 30, and the mass of the insulating particles per unit area in the second intermediate layer 34 disposed on the outer peripheral side of the wound positive electrode current collector 30, is not particularly limited. The former and the latter are each preferably within a range of, for example, 1.0 g/cm$^2$ to 8.0 g/cm$^2$ in view of more effectively preventing the reduction in the battery capacity and the temperature rise of the battery upon internal short. Accordingly, when the positive electrode 11 is produced, the mass of the insulating particles per unit area in the first intermediate layer 32 and the mass of the insulating particles per unit area in the second intermediate layer 34 are preferably tailored so that positive electrode 11 after winding satisfies the above-described range.

[Negative Electrode]

The negative electrode 12 comprises, for example, a negative electrode current collector formed of a metal foil, for example, and a negative electrode mixture layer formed on the negative electrode current collector. Foil of a metal, such as copper, that is stable in the electric potential range of the negative electrode, a film with such a metal disposed on an outer layer, and the like can be used for the negative electrode current collector. The negative electrode mixture layer includes, for example, a negative electrode active material, a binder, and a thickener, and other ingredients.

The negative electrode 12 can be obtained by, for example, applying a negative electrode mixture slurry including the negative electrode active material, the thickener, and the binder to the negative electrode current collector, drying the resultant coating to form a negative electrode mixture layer on the negative electrode current collector, and rolling the negative electrode mixture layer. The negative electrode mixture layer may be formed on each of the both sides of the negative electrode current collector.

The negative electrode active material is not particularly limited as long as it is a material that can intercalate and deintercalate lithium ions, and examples thereof include lithium metal, lithium alloys such as lithium-aluminum alloy, lithium-lead alloy, lithium-silicon alloy, and lithium-tin alloy, carbon materials such as graphite, coke, and organic fired materials, and metal oxides such as $SnO_2$, $SnO$, and $TiO_2$. These may be used singly or in combinations of two or more thereof.

As the binder included in the negative electrode mixture layer, a fluoro resin, PAN, a polyimide resin, an acrylic resin, a polyolefin resin, or the like can be used, for example. When a negative electrode mixture slurry is prepared using an aqueous medium, styrene-butadiene rubber (SBR), CMC or a salt thereof, poly(acrylic acid) (PAA) or a salt thereof (PAA-Na, PAA-K, or the like which may be a partially neutralized salt), or poly(vinyl alcohol) (PVA) is preferably used.

[Separator]

For example, an ion-permeable and insulating porous sheet is used as the separator 13. Specific examples of the porous sheet include a microporous thin film, woven fabric, and nonwoven fabric. Suitable examples of the material for the separator include olefin resins such as polyethylene and polypropylene, and cellulose. The separator 13 may be a laminate including a cellulose fiber layer and a layer of fibers of a thermoplastic resin such as an olefin resin. The separator 13 may be a multi-layered separator including a polyethylene layer and a polypropylene layer, and a surface of a separator to be used may be coated with a material such as an aramid resin or ceramic.

[Electrolyte]

The electrolyte includes a solvent and an electrolyte salt dissolved in the solvent. The electrolyte is not limited to a liquid electrolyte (electrolyte), and may be a solid electrolyte using a gel polymer or the like. As the solvent, a non-aqueous solvent or an aqueous medium or the like can be used, and example of the non-aqueous solvent include esters, ethers, nitriles such as acetonitrile, amides such as dimethylformamide, and mixed solvents of two or more thereof. The non-aqueous solvent may include a halogen-substituted product formed by replacing at least one hydrogen atom of any of the above solvents with a halogen atom such as fluorine.

Examples of the esters include cyclic carbonate esters, such as ethylene carbonate (EC), propylene carbonate (PC), and butylene carbonate; chain carbonate esters, such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylate esters such as γ-butyrolactone and γ-valerolactone; and chain carboxylate esters such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

Preferable examples of the halogen-substituted product for use include a fluorinated cyclic carbonate ester such as fluoroethylene carbonate (FEC), a fluorinated chain carbonate ester, and a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_6F_{2n+1})_x$ (where $1 \leq x \leq 6$, and n is 1 or 2), $LiB_{10}Cl_{10}$, LiCl, LiBr, LiI, chloroborane lithium, lithium short-chain aliphatic carboxylates; borate salts such as $Li_2B_4O_7$, $Li(B(C_2O_4)_2)$; and imide salts such as $LiN(SO_2CF_3)_2$ and $LiN(C_lF_{2l-1}SO_2)(C_mF_{2m+1}SO_2)$ (where l and m are integers of 1 or more). These lithium salts may be used singly or two or more thereof may be mixed and used. Among these, $LiPF_6$ is preferably used in view of ionic conductivity, electrochemical stability, and other properties. The concentration of the lithium salt is preferably 0.8 to 1.8 mol per 1 L of solvent.

EXAMPLES

Hereinafter, the present disclosure will be described in more details by way of Examples, but the present disclosure is not limited thereby.

Example 1

[Production of Positive Electrode]

$Al_2O_3$ as insulating particles, acetylene black as a conductive agent, and poly(vinylidene fluoride) (PVDF) as a binder were mixed in a mass ratio of 95:3:2, and an appropriately amount of N-methyl-2-pyrrolidone (NMP) was added thereto to prepare a slurry for a first intermediate layer. $Al_2O_3$ as insulating particles, acetylene black as a conductive agent, and poly(vinylidene fluoride) (PVDF) as a binder were mixed in a mass ratio of 95:3:2, and an appropriately amount of N-methyl-2-pyrrolidone (NMP) was added thereto to prepare a slurry for a second intermediate layer.

Then, the slurry for a first intermediate layer was applied to the side that was to be the inner peripheral side when wound among both sides of an aluminum foil having a thickness of 15 μm as a positive electrode current collector, and the resultant coating was dried to form the first intermediate layer having a thickness of 2.0 μm. Next, the slurry for a second intermediate layer was applied to the other side that was to be the outer peripheral side when wound among both sides of the positive electrode current collector, and the resultant coating was dried to form the second intermediate layer having a thickness of 2.5 μm. The mass of the insulating particles per unit area in each intermediate layer was measured. As a result, the mass of the insulating particles per unit area in the first intermediate layer was 4 $g/m^2$, and the mass of the insulating particles per unit area in the second intermediate layer was 5 $g/m^2$.

Then, $LiNi_{0.5}Co_{0.2}Mn_{0.3}O_2$ as a positive electrode active material, acetylene black (AB), and poly (vinylidene fluoride) (PVDF) are mixed in a mass ratio of 94:5:1, and an appropriately amount of N-methyl-2-pyrrolidone (NMP) is added thereto to prepare a positive electrode mixture slurry. Then, the positive electrode mixture slurry was applied to the first intermediate layer and the second intermediate layer. The resultant coatings were dried and then rolled with a roller to thereby obtain a positive electrode of Example 1.

[Production of Negative Electrode]

Artificial graphite, carboxymethylcellulose (CMC), and styrene-butadiene rubber (SBR) were mixed in a mass ratio of 100:1:1 to prepare a negative electrode mixture slurry. Then, the negative electrode mixture slurry is applied to both sides of a copper foil as a negative electrode current collector. The resultant coating is dried and then rolled with a roller, to thereby produce a negative electrode composed of the negative electrode current collector and the negative electrode mixture layers formed on both sides thereof

[Production of Electrolyte]

Ethylene carbonate (EC), methyl ethyl carbonate (EMC), and dimethyl carbonate (DMC) were mixed in a volume ratio of 3:3:4. $LiPF_6$ is dissolved in the mixed solvent at a concentration of 1.2 mol/L to thereby produce an electrolyte (a non-aqueous electrolyte).

[Production of Non-Aqueous Electrolyte Secondary Battery]

The positive electrode and the negative electrode obtained above are each cut into a prescribed size, and an electrode tab is attached to each of them. The electrodes are wound with the separator disposed therebetween to thereby produce a wound-type electrode assembly. This electrode assembly is then housed in an aluminum-laminated film case, and the non-aqueous electrolyte is injected thereinto. The case is sealed to thereby obtain a non-aqueous electrolyte secondary battery of Example 1.

Example 2

A positive electrode was produced in the same manner as in Example 1, except that the thickness of the first intermediate layer was 1.5 The mass of the insulating particles per unit area in the first intermediate layer was 3 g/m². A non-aqueous electrolyte secondary battery was produced using the resulting positive electrode of Example 2 in the same manner as in Example 1.

Example 3

A positive electrode was produced in the same manner as in Example 1, except that the thickness of the first intermediate layer was 0.5 The mass of the insulating particles per unit area in the first intermediate layer was 1 g/m². A non-aqueous electrolyte secondary battery was produced using the resulting positive electrode of Example 3 in the same manner as in Example 1.

Comparative Example 1

A positive electrode was produced in the same manner as in Example 1, except that the first intermediate layer or the second intermediate layer was not formed. A non-aqueous electrolyte secondary battery was produced using the resulting positive electrode of Comparative Example 1 in the same manner as in Example 1.

Comparative Example 2

A positive electrode was produced in the same manner as in Example 1, except that the thickness of the first intermediate layer was 2.5 μm. The mass of the insulating particles per unit area in the first intermediate layer was 5 g/m². A non-aqueous electrolyte secondary battery was produced using the resulting positive electrode of Comparative Example 2 in the same manner as in Example 1.

Comparative Example 3

A positive electrode was produced in the same manner as in Example 1, except that the thickness of the first intermediate layer was 0.5 μm, and that the thickness of the second intermediate layer was 0.5 μm. The mass of the insulating particles per unit area in the first intermediate layer was 1 g/m², and the mass of the insulating particles per unit area in the second intermediate layer was 1 g/m². A non-aqueous electrolyte secondary battery was produced using the resulting positive electrode of Comparative Example 3 in the same manner as in Example 1.

[Nail-Driving Test]

A nail-driving test in the following manner is carried out on the non-aqueous electrolyte secondary batteries according to Examples and Comparative Examples.

(1) In an environment at 25° C., the battery is charged at a constant current of 600 mA to a battery voltage of 4.2 V, and then continuously charged at the constant voltage to a current value of 90 mA.

(2) In an environment at 25° C., the point of a wire nail having a thickness of 2.7 mm is brought into contact with the middle of the lateral surface of the battery charged in (1), and the wire nail is driven at a rate of 1 mm/sec in the direction of the lamination of the electrode assembly. Just after voltage depression of the battery due to internal short is detected, the driving of the wire nail is stopped.

(3) The temperature of the battery surface is determined one minute after the battery starts short due to the wire nail.

[Measurement of Battery Capacity]

In an environment at a temperature of 25° C., each of the non-aqueous electrolyte secondary batteries of Examples and Comparative Examples was subjected to constant current-charging at a constant current of 600 mA to a battery voltage of 4.2 V, and then subjected to constant current-discharging at a constant current of 600 mA to a battery voltage of 3.0 V. The discharge capacity at that time was defined as a battery capacity.

The results of the nail-driving test and the results of the battery capacity of the non-aqueous electrolyte secondary batteries of Examples and Comparative Examples are shown in Table 1. As for the battery capacity, the battery capacity in Comparative Example 1 was regarded as the reference (100%), and the battery capacity in other Examples and Comparative Examples are indicated relatively thereto.

TABLE 1

| | First Intermediate Layer | | | Second Intermediate Layer | | | Temperature of Battery after Nail-Driving Test (After 1 min) (° C.) | Battery Capacity |
|---|---|---|---|---|---|---|---|---|
| | Insulating Particles | Thickness (μm) | Mass of Insulating Particles per Unit Area (g/m²) | Insulating Particles | Thickness (μm) | Mass of Insulating Particles per Unit Area (g/m²) | | |
| Example 1 | $Al_2O_3$ | 2.0 | 4 | $Al_2O_3$ | 2.5 | 5 | 52 | 97.3% |
| Example 2 | $Al_2O_3$ | 1.5 | 3 | $Al_2O_3$ | 2.5 | 5 | 55 | 97.6% |
| Example 3 | $Al_2O_3$ | 0.5 | 1 | $Al_2O_3$ | 2.5 | 5 | 60 | 98.2% |
| Comparative Example 1 | — | — | — | — | — | — | 120 | 100.0% |
| Comparative Example 2 | $Al_2O_3$ | 2.5 | 5 | $Al_2O_3$ | 2.5 | 5 | 50 | 97.0% |
| Comparative Example 3 | $Al_2O_3$ | 0.5 | 1 | $Al_2O_3$ | 0.5 | 1 | 115 | 98.8% |

In all of Examples 1 to 3, the temperature rise of the battery after the nail-driving test, i.e., the temperature rise of the battery upon internal short was suppressed, and the reduction in the battery capacity was also prevented. On the other hand, the temperature rise of the battery upon internal short was suppressed in Comparative Example 2 while the battery capacity was reduced as compared to Examples 1 to 3. In Comparative Example 3, the reduction in the battery capacity was prevented but the temperature rise of the battery upon internal short was almost not suppressed.

REFERENCE SIGNS LIST 10 secondary battery
11 positive electrode
12 negative electrode
13 separator
14 electrode assembly
15 battery case
16 case body
17 sealing assembly
18, 19 insulating plate
20 positive electrode lead
21 negative electrode lead
22 projecting portion
23 filter
24 lower vent member
25 insulating member
26 upper vent member
27 cap
28 gasket
30 positive electrode current collector
32 first intermediate layer
34 second intermediate layer
36 positive electrode mixture layer

The invention claimed is:

1. A positive electrode for use in a secondary battery, the positive electrode being to be wound in the secondary battery and comprising:
   a positive electrode current collector;
   a first intermediate layer disposed on a side that is to be an inner peripheral side when wound, among both sides of the positive electrode current collector;
   a second intermediate layer disposed on another side that is to be an outer peripheral side when wound;
   a positive electrode mixture layer disposed on the first intermediate layer, and another positive electrode mixture layer disposed on the second intermediate layer;
   wherein the first intermediate layer and the second intermediate layer each include insulating particles and a conductive agent,
   and a thickness of the first intermediate layer is smaller than a thickness of the second intermediate layer.

2. A positive electrode for use in a secondary battery, the positive electrode being to be wound in the secondary battery and comprising:
   a positive electrode current collector;
   a first intermediate layer disposed on a side that is to be an inner peripheral side when wound, among both sides of the positive electrode current collector;
   a second intermediate layer disposed on another side that is to be an outer peripheral side when wound;
   a positive electrode mixture layer disposed on the first intermediate layer, and another positive electrode mixture layer disposed on the second intermediate layer;
   wherein the first intermediate layer and the second intermediate layer each include insulating particles and a conductive agent,
   and a mass of the insulating particles per unit area in the first intermediate layer is smaller than a mass of the insulating particles per unit area in the second intermediate layer.

3. The positive electrode according to claim 1, wherein the insulating particles include at least any one selected from the group consisting of aluminum oxide, titanium oxide, zirconium oxide, silicon oxide, manganese oxide, magnesium oxide, nickel oxide, boron nitride, aluminum nitride, magnesium nitride, silicon nitride, aluminum fluoride, lithium fluoride, sodium fluoride, magnesium fluoride, calcium fluoride, barium fluoride, aluminum hydroxide, boehmite, and Ni—Cu—Zn ferrite.

4. The positive electrode according to claim 1, wherein the mass of the insulating particles per unit area in the first intermediate layer is within a range of 0.1 $g/m^2$ to 5 $g/m^2$, and the mass of the insulating particles per unit area in the second intermediate layer is within a range of 0.5 $g/m^2$ to 10 $g/m^2$.

5. The positive electrode according to claim 1, wherein the thickness of the first intermediate layer is within a range of 0.1 to 5 μm, and the thickness of the second intermediate layer is within a range of 0.5 to 10 μm.

6. A secondary battery comprising the positive electrode according to claim 1.

7. The positive electrode according to claim 2, wherein the insulating particles include at least any one selected from the group consisting of aluminum oxide, titanium oxide, zirconium oxide, silicon oxide, manganese oxide, magnesium oxide, nickel oxide, boron nitride, aluminum nitride, magnesium nitride, silicon nitride, aluminum fluoride, lithium fluoride, sodium fluoride, magnesium fluoride, calcium fluoride, barium fluoride, aluminum hydroxide, boehmite, and Ni—Cu—Zn ferrite.

8. The positive electrode according to claim 2, wherein the mass of the insulating particles per unit area in the first intermediate layer is within a range of 0.1 $g/m^2$ to 5 $g/m^2$, and the mass of the insulating particles per unit area in the second intermediate layer is within a range of 0.5 $g/m^2$ to 10 $g/m^2$.

9. The positive electrode according to claim 2, wherein the thickness of the first intermediate layer is within a range of 0.1 to 5 and the thickness of the second intermediate layer is within a range of 0.5 to 10 μm.

10. A secondary battery comprising the positive electrode according to claim 2.

* * * * *